(12) United States Patent
Bartolo et al.

(10) Patent No.: US 7,609,036 B2
(45) Date of Patent: Oct. 27, 2009

(54) CONTROL DEVICE FOR A SWITCHING CONVERTER AND RELATED SWITCHING CONVERTER

(75) Inventors: Vincenzo Bartolo, Milan (IT); Dennis Marelli, Cantu' (IT); Francesco Griseta, Como (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 411 days.

(21) Appl. No.: 11/553,066

(22) Filed: Oct. 26, 2006

(65) Prior Publication Data

US 2007/0108952 A1 May 17, 2007

(30) Foreign Application Priority Data

Oct. 27, 2005 (IT) .......................... MI2005A2055

(51) Int. Cl.
*G05F 1/613* (2006.01)
*G05F 1/00* (2006.01)

(52) U.S. Cl. ........................ 323/224; 323/288; 323/283

(58) Field of Classification Search ................. 323/224, 323/288, 283
See application file for complete search history.

(56) References Cited

U.S. PATENT DOCUMENTS

| 5,627,460 | A  | * | 5/1997  | Bazinet et al. | ............... 323/288 |
| 7,138,786 | B2 | * | 11/2006 | Ishigaki et al. | ............... 323/224 |
| 7,145,316 | B1 | * | 12/2006 | Galinski, III | ................ 323/288 |
| 7,199,561 | B2 | * | 4/2007  | Noma | ........................ 323/224 |

* cited by examiner

*Primary Examiner*—Shawn Riley
(74) *Attorney, Agent, or Firm*—Hogan & Hartson LLP

(57) ABSTRACT

A control device for a switching converter having an input terminal, an output terminal, a semi-bridge of a first and second transistor coupled between the input terminal and a reference voltage, includes a first circuit for driving the first transistor and a second circuit for driving the second transistor. The converter further includes a bootstrap circuit for powering the first drive circuit. The bootstrap circuit includes a capacitor coupled between a supply voltage and the common terminal of the first and second transistors. The control device acts upon the second transistor to assure the charging of the capacitor.

20 Claims, 4 Drawing Sheets

CONTROL DEVICE FOR A SWITCHING CONVERTER AND RELATED SWITCHING CONVERTER

RELATED APPLICATION

The present application claims priority of Italian Patent Application No. MI2005A002055 filed Oct. 27, 2005, which is incorporated herein in its entirety by this reference.

FIELD OF THE INVENTION

The present invention relates to a device for controlling a switching converter and the related switching converter.

BACKGROUND OF THE INVENTION

Switching converters such as the buck converter shown in FIG. 1 are generally known in the current state of the art. Said converter comprises an MOS transistor 1 having a non-drivable terminal coupled to an input voltage Vin and another non-drivable terminal coupled to the cathode of an asynchronous rectifier diode D1 having its anode coupled to ground GND; the transistor is driven by a control device 2. The cathode of the diode D1 is coupled to a low-pass filter comprising an inductor L and capacitor C from whose ends the converter output voltage Vout is drawn.

In conditions of operation with the continuous conduction mode (CCM), that is when the current in the inductor L never goes to zero, and with a resistive type of load LOAD, if the transistor 1 has an "on" time Ton and an "off" time Toff, where T=Ton+Toff, it follows that Vout=D*Vin where D is the duty cycle given by D=Ton/T. In conditions of operation with the discontinuous conduction mode (DCM), that is when the current in the coil goes to zero during the switching period, the output voltage Vout is a function of the value of the inductor L, time period T, duty cycle D and input voltage Vin, i.e.

$$Vout = \frac{2Vin}{1 + \left(1 + \frac{8L}{RT} * \frac{1}{D^2}\right)^2}$$

where R is the resistive value of the load LOAD.

Another buck converter layout is shown in FIG. 2. The converter comprises a first MOS transistor HS having a non-drivable terminal coupled to the input voltage Vin and another non-drivable terminal P coupled to a terminal of the inductor L and a non-drivable terminal of a second MOS transistor LS coupled to ground GND. The other terminal of inductor L is coupled to the capacitor C, having its other terminal coupled to ground GND; the capacitor C is placed in parallel with the load LOAD and a resistive divider comprising a series of two resistors, R1 and R2. A fraction VFB of the output voltage Vout is input to a control device 20. The transistors HS and LS are switched on in a push-pull mode and as a result there is a lower power dissipation, given that the voltage drop at the ends of the transistor LS is lower than the voltage drop on the diode.

The control device 20 comprises a first circuit 24 comprising in turn a comparator for comparing the voltage VFB with a reference voltage Vref and means able to effect a pulse width modulation (PWM) in response to said comparison. The control device 20 comprises two drive circuits or drivers 21 and 22 receiving as inputs the PWM signals output by the circuit 24 and able to drive the transistors HS and LS via the signals HSIDE and LSIDE. The driver 22 is powered by a voltage Vccdr whereas driver 21 is powered by a voltage Vcb originating from a bootstrap circuit 23 comprising a capacitor Cboot situated between the node P and the cathode of a diode Dcb having its anode coupled to the voltage Vccdr.

When the converter is switched on, the node P is grounded GND and the capacitance Cboot is charged to the voltage Vccdr−Vd where Vd is the voltage drop of the diode Dcb. When a pulse arrives from the PWM signal output by circuit 24, driver 21 starts to charge the gate of the HS transistor, supplying a charge Q drawn from the capacitance Cboot. When the HS transistor is switched on, the node P is brought to the voltage Vin and the voltage Vcb is forcibly brought to the voltage Vin+Vcboot where Vcboot is the voltage at the ends of the capacitor Cboot. In this condition the driver 21 supplies a voltage to the gate of the HS transistor that is sufficient to keep it on. The switching cycle concludes with the switching off of the transistor HS, whose gate is brought to the voltage of the node P. When the transistor LS is switched on, the node P is again brought to ground GND and the capacitance Cboot is thus recharged via the diode Dcb.

In switching periods where the node P is not brought to ground GND, the capacitor Cboot, non-recharged, tends to become discharged due to leakage currents and the charging of the capacitance Cgs of the transistor HS. In the event of a sequence of consecutive cycles in which this occurs, the capacitor Cboot may become discharged to a point where the voltage is no longer sufficient to enable the HS transistor to be switched on.

Such a situation occurs when the device operates with a duty cycle D=1 or when the converter is unable to discharge the current of the inductor L and a residual output current remains; in the latter case, when the device is switched on, the voltage to at the node P is equal to the voltage Vout. In either case the voltage Vgs between the source and gate of the HS transistor will not be sufficient to switch it on.

SUMMARY OF THE INVENTION

In view of the current state of the art, the object of the present invention is to provide a control device for a switching converter that overcomes the aforesaid drawback.

According to the present invention this object is achieved by means of a switching converter control device having an input terminal and output terminal, said converter comprising a semi-bridge of a first and second transistor coupled between the input terminal and a reference voltage, said control device comprising a first circuit suitable for driving said first transistor and a second circuit suitable for driving said second transistor, said converter comprising a bootstrap circuit suitable for powering said first drive circuit, said bootstrap circuit comprising a capacitor coupled between a supply voltage and the terminal shared by said first and second transistors, further characterized in that it comprises means capable of acting upon said second transistor in order to assure the charging of said capacitor.

BRIEF DESCRIPTION OF THE DRAWINGS

The characteristics and advantages of the present invention will become apparent from the following detailed description of the practical embodiments thereof, illustrated as non-restrictive examples in the appended drawings, in which.

DETAILED DESCRIPTION

Figure 1:
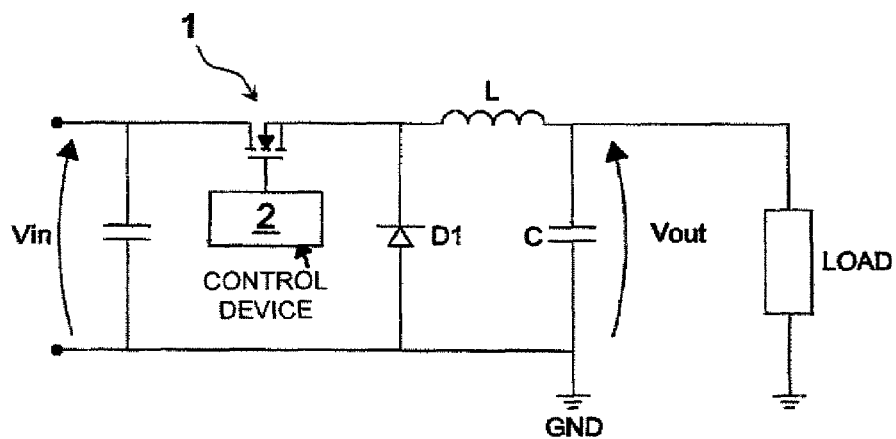
FIG. 1 is a diagram of a known buck converter layout.
Figure 2:
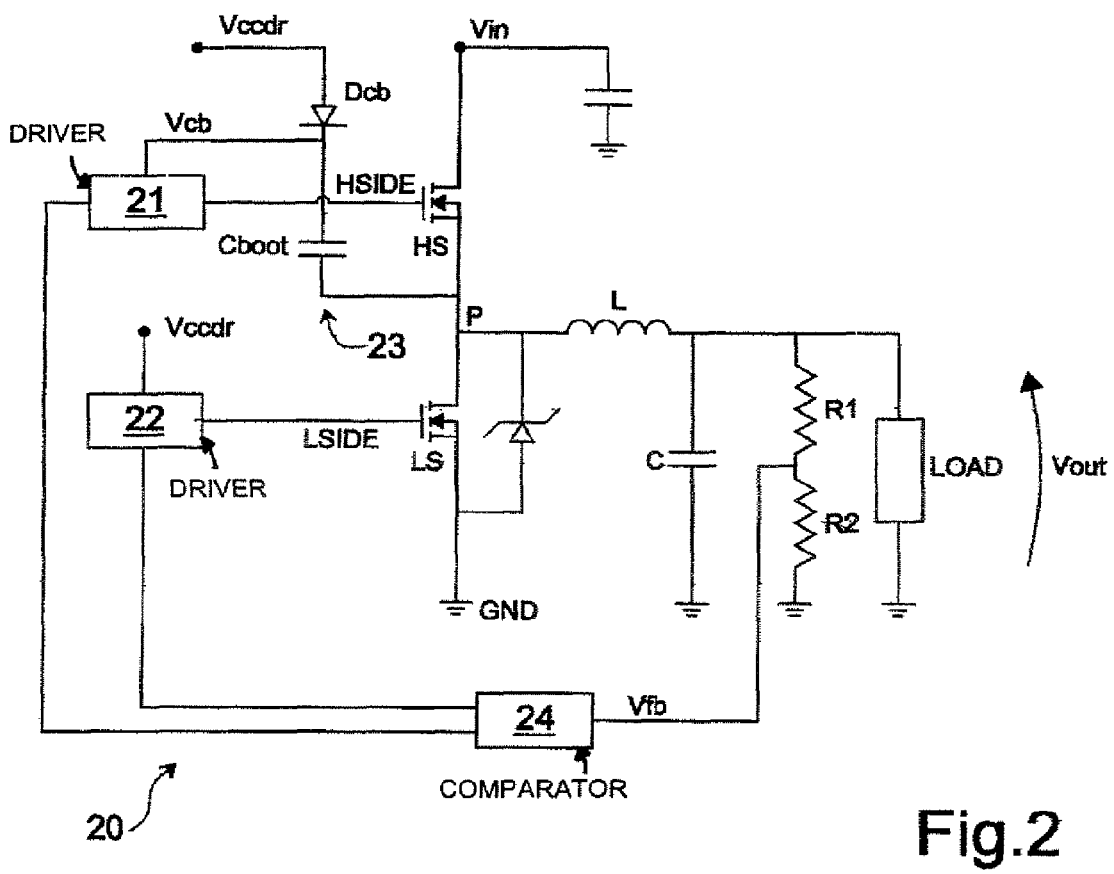
FIG. 2 is a diagram of another buck converter according to the known prior art.
Figure 3:
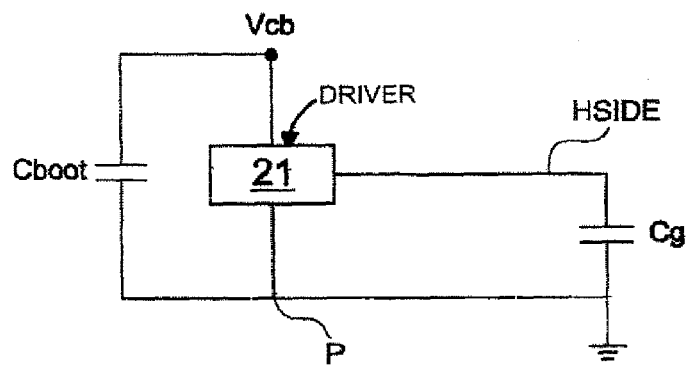
FIG. 3 is a diagram of an equivalent capacitance Cboot discharge circuit.

Considering the buck converter layout illustrated in FIG. 2, the aforesaid situation in which the capacitor Cboot discharges to a point where the voltage is no longer sufficient to switch on the HS transistor is overcome when the output voltage Vout becomes such as to enable charging of the capacitor Cboot. The discharging of the capacitor Cboot occurs in a different manner in the two previously mentioned cases. Where the duty cycle D=1, no switching takes place and the capacitor Cboot discharges linearly. Where D<1, the capacitor Cboot will discharge more rapidly due to the charge required by the capacitance Cg, i.e. the capacitance seen from the gate terminal of the transistor HS, which substantially coincides with the capacitance Cgs between the gate and source terminals of the transistor HS, as can be seen from FIG. 3. At each switching cycle the voltage Vcb drops by an amount DV: the higher the ratio between the capacitances Cg and Cboot, the higher the voltage drop, i.e.:

$$DV = Vcb \frac{Cg}{Cg + Cboot}.$$

Expressing the voltage Vcb at the Nth cycle as a function of the voltage Vcb at the previous cycle it follows that:

$$Vcb(N) = Vcb(N-1) \frac{Cg}{Cg + Cboot}.$$

If we indicate as Vcb_max the initial voltage versus the capacitance Cboot it follows that $$Vcb(N) = Vcb\_max * \left[\frac{Cboot}{Cboot + Cg}\right]^N.$$

Given a fixed minimum tolerable voltage Vcb we will have an upper limit G versus N; when this limit is exceeded the capacitance Cboot will discharge to below the pre-established minimum value, i.e.

$$N < \frac{\ln\left(\frac{Vcb\_min}{Vcb\_max}\right)}{\ln\left(\frac{Cboot}{Cboot + Cg}\right)} = G.$$

Figure 4:
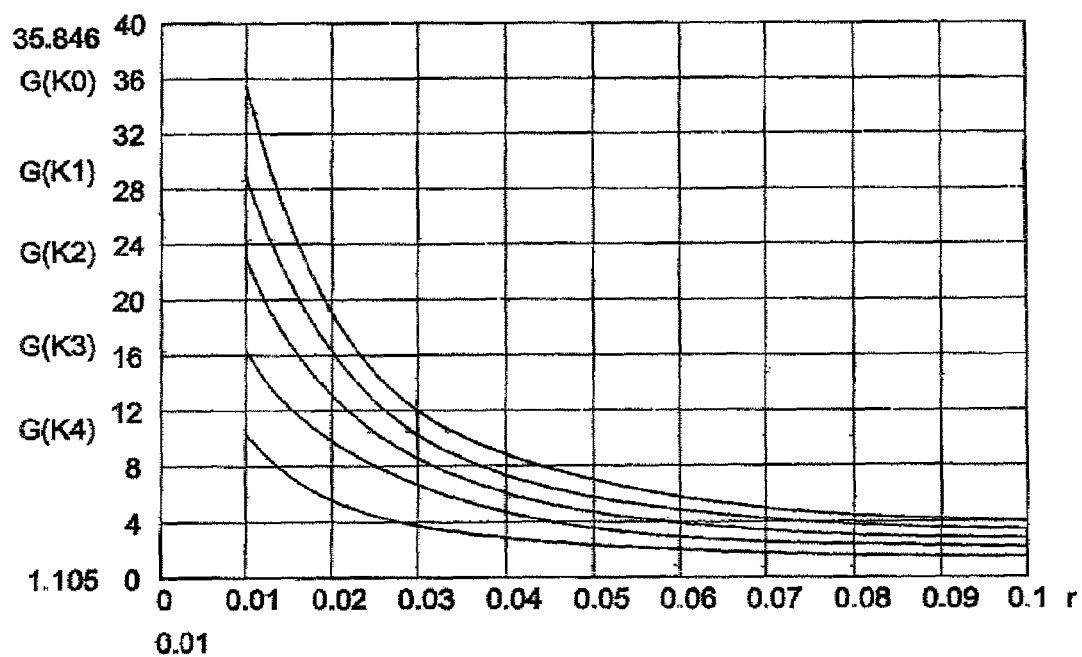
FIG. 4 is a graph illustrating the trend in the maximum value of the number of non-switching cycles in order for the capacitance Cboot not to be discharged.

FIG. 4 shows a graph of the trend in the maximum number of non-switching cycles in order for the capacitance Cboot not to be discharged, where X=Cg/Cboot and ki=Vcb_min/Vcb_max and where Vcb_max=5V and Vcb_min(k0)=4.5V, Vcb_min(k1)=4.25V, Vcb_min(k2)=4.0V, Vcb_min(k3)=3.75V and Vcb_min(k4)=3.5V.

Figure 5:
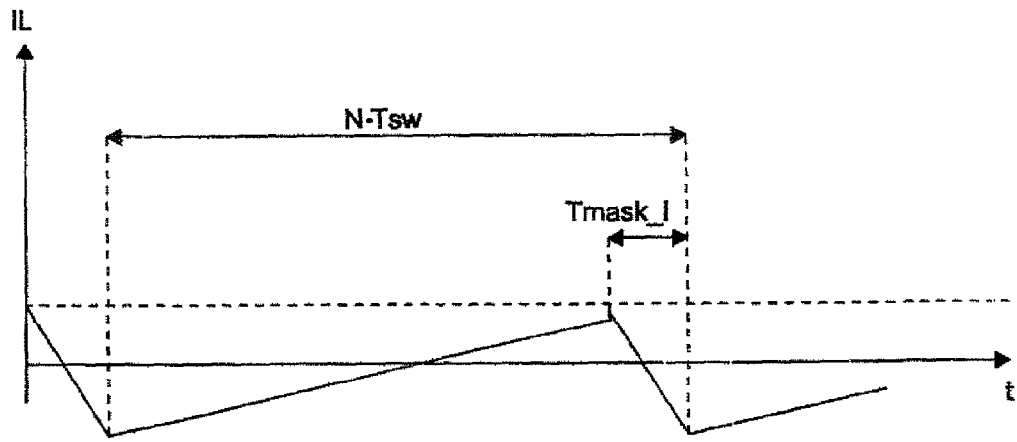
FIG. 5 is a graph illustrating a possible time trend of the current IL.

In the event that the aforesaid condition is met, another problem may arise: it may happen that the converter induces a decrease in the current IL that flows through the inductor L. If the decrease in the current IL during the switching on of the transistor LS in the period Tmask_1 is greater than the increase during the time periods Ton, the average current will decrease, becoming negative. To avoid this it is necessary to forcibly impose an "off" time Toff after a number of cycles N greater than $$\frac{Tmask\_1}{Tsw} * \frac{Vout}{Vin - Vout} = \frac{Tmask\_1}{Tsw} * \frac{D}{1-D} = H$$

where Tmask_1 is the descent time of the current IL (with IL(t) (Vout/L)*t) and Tsw is the cycle period so that in the period given by N*Tsw−Tmask_1 the current IL(t)((Vin−Vout)/L)*t, as may be seen from FIG. 5. From the value of N, the value $$D\max < 1 - \frac{Tmask\_1}{N * Tsw}$$

is obtained, i.e. the maximum value of the duty cycle D. Therefore, the number of switching cycles N in which it is possible to force the HS transistor off without running into the above-described problems will have a maximum given by G and a minimum given by H. Having thus fixed the value Dmax, i.e. the maximum value of the duty cycle D, the minimum value H of the number of cycles N will likewise be fixed. With this minimum value it is possible to dimension the Cboot/Cg ratio so as to obtain the desired voltage Vcb_min.

Figure 6:
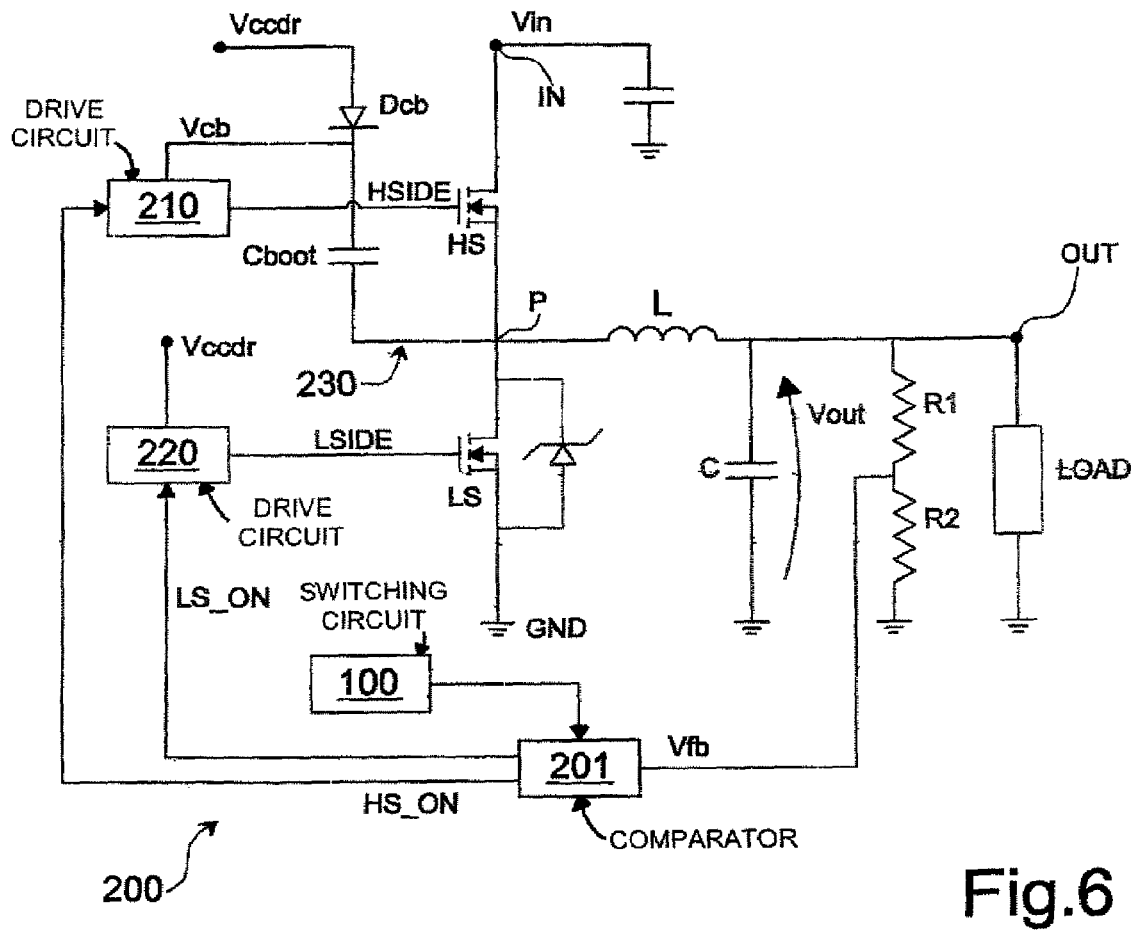
FIG. 6 is a diagram of a switching converter provided with a control device according to the present invention.

FIG. 6 shows a control device of a switching converter according to the invention. The converter comprises a first MOS transistor HS having a non-drivable terminal coupled to the input voltage Vin, present at the converter input terminal IN, and another non-drivable terminal P coupled to a terminal of the inductor L and a non-drivable terminal of a second MOS transistor LS coupled to ground GND. The other terminal of the inductor L is coupled to the converter output terminal OUT and to the capacitor C, whose other terminal is coupled to ground GND; the capacitor C is placed in parallel with the load LOAD and a resistive divider comprising a series of two resistors, R1 and R2. A fraction VFB of the output voltage Vout is input to a control device 200. The transistors HS and LS are switched on in a push-pull mode and this results in a lower power dissipation given that the voltage drop at the ends of the LS transistor is lower than the voltage drop on the diode.

The control device 200 comprises a first circuit 201 comprising a comparator for comparing the voltage VFB with a reference voltage Vref and means able to effect a pulse width modulation (PWM) in response to said comparison. The control device 200 comprises two drive circuits or drivers 210 and 220 receiving as inputs the signals HS_ON and LS_ON output by the circuit 201 and which are able to drive the transistors HS and LS via the signals HSIDE and LSIDE. The driver 220 is powered by a voltage Vccdr (e.g. 5 Volts) whereas the driver 210 is powered by a voltage Vcb (e.g. 3 Volts) originating from a bootstrap circuit 230 comprising a capacitor Cboot placed between the node P and cathode of a diode Dcb having its anode coupled to the voltage Vccdr.

The control device 200 comprises means 100 capable of assuring the correct recharging of the capacitor Cboot in all operating conditions. Said means 100 are able to switch on the transistor LS so as to assure correct recharging of the capacitor Cboot in all operating conditions.

Figure 7:
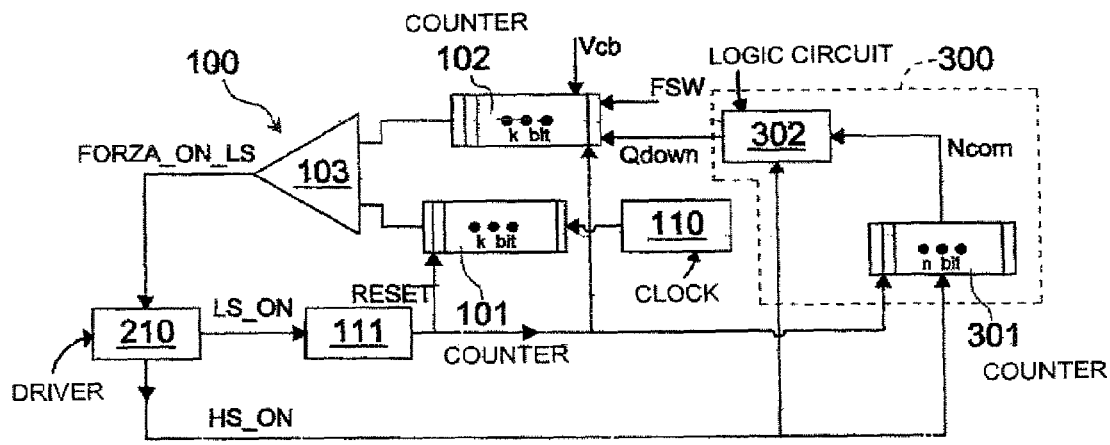
FIG. 7 is a diagram of a part of the control device of FIG. 6 according to a first embodiment of the present invention and a variant thereof.

According to a first embodiment of the invention, said means 100 comprise a first k bit counter 101 and a second k bit counter 102, as may be better seen from FIG. 7. In each switching cycle during which the transistor LS is not switched on, the count value of the counter 101 is increased by one unit; therefore the means 100 comprise a clock device 110 set on the cycle frequency which delivers a pulse per cycle to the counter 101 and a device 111 able to re-initialize the counter 101 via a RESET signal in the presence of a pulse LS_ON. If the Count value of the counter 101 reaches the preset threshold value Count_th of the second counter 102 a signal FORZA_ON_LS is generated to force the transistor LS to switch on. This is carried out by means of a comparator 103 able to compare the Count and Count_th values of the counters 101 and 102 and to generate a signal in response to said comparison. The signal LS_ON has a duration equal to a Tmask_1. When the transistor LS is switched on by means of the signal FORZA_LS_ON or even if the switching on takes places before the Count value reaches the Count_th value, the device 111 will transmit a reset signal to the counter 101.

The threshold value Count_th corresponds to the maximum number of cycles in which it is admissible for no switching of the transistor LS to take place; said value depends on the leakage current Ileak, the voltage Vcb, the value of the capacitor Cboot, the frequency of the cycles Fsw and the minimum tolerated voltage value Vcb_min. Where the Ileak and Vcb_min values are known it follows that $$T\max = \frac{(Vcb - Vcb\_min) * Cboot}{Ileak}$$

where Tmax is the interval of time beyond which, if no transistor HS and LS switching takes place, the capacitor Cboot will be discharged to the minimum voltage Vcb_min. It follows that Count_th=Tmax*Fsw.

According to a variant of the first embodiment, said control device includes means 300 able to modulate the threshold value Count_th. Every time the transistor HS is switched on, the capacitor Cboot loses a charge Qon which will depend on the voltage Vcb, the capacitance Cboot and the capacitance Cg of the transistor HS. The charge Qon to be supplied to the gate of the transistor HS per switch-on operation may be expressed as follows:

$$Qon(N) = Ggs * \frac{Cboot}{Cboot + Cgs} Vcb(N-1).$$

The discharge time of the leakage current Ileak is Tleak=Qon/Ileak. The means 300 comprise an n bit counter 301 which receives an input signal HS_ON in order to keep a count of the number of switching operations of the transistor HS; said counter 301 increments its value at each switching of the transistor HS and outputs a signal Ncom in relation to the number of switching operations of the transistor HS. The counter 301 also receives an input RESET signal from the means 111 which serves to re-initialize the counter 301 at the instant the counter 101 is re-initialized. A logic circuit 302 is able to provide a quantity Qdown to the counter 102 so as to decrease the Count_th threshold of said quantity Qdown at every switch-on operation of the transistor HS; said quantity Qdown is variable and determined according to the value Tleak. The first time the transistor HS is switched on, Qdown=Tleak, the second time the transistor HS is switched on, Qdown=(½)*Tleak, the third time the transistor HS is switched on, Qdown=(⅓)*Tleak and so on up to the nth time the transistor HS is switched on, when Qdown (1/n)*Tleak.

Accordingly, the first time the transistor HS is switched on the threshold Count_th is decreased by the quantity Tleak, the second time the transistor HS is switched on the threshold Count_th is decreased by a quantity equal to ½ Tleak, the third time the transistor HS is switched on the threshold Count_th is decreased by a quantity equal to ⅓*Tleak and so on up to the $n^{th}$ time the transistor HS is switched on, when the threshold Count_th is decreased by a quantity equal to 1/n*Tleak.

Since in the majority of applications Vcb_min is a value higher than 80% of the normal voltage Vboot, one may assume a Tleak that is constant and independent of the voltage Vcb when a switching on of the transistor HS takes place. As a result, according to another variant of the first embodiment of the inventions the means 300 operate in such a way as to reduce the Count_th value by a fixed amount each time the transistor HS is switched on. In such a case the means 300 will not comprise the counter 301. The counter 102 receives as an input a RESET signal which re-initializes the counter every time the transistor LS is switched on.

Figure 8:
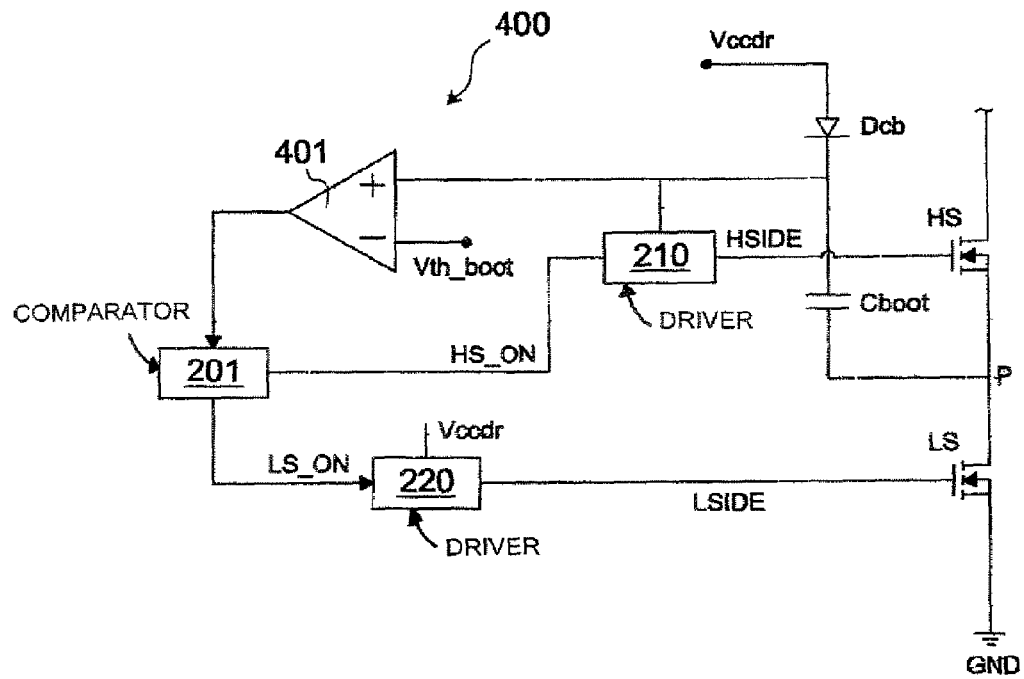
FIG. 8 is a diagram of a part of the control device of FIG. 6 according to a second embodiment of the present invention.

According to a second embodiment of the present invention, the means 100 of the control device 200 are implemented in a different manner than in the first embodiment, as may be seen from FIG. 8. Said means 100 comprise means 400 capable of monitoring the charge status of the capacitor Cboot, for example by means of a comparator 401 which compares the voltage between the node Vcb and the node P with a fixed voltage Vth_boot. When the capacitance Cboot discharges to a point causing the voltage at the pin Vcb to fall below the threshold Vth_hoot, the comparator 401 switches, sending a signal to the circuit 201, which forces the transistor LS to switch on for a length of time Tmask_1. While the transistor LS is switched on, the voltage at the node P is brought to ground for a period of time equal to TMASK_L. In this phase the voltage at the terminals of diode Dcb is such as to allow the passage of current and provide a voltage Vcb=Vccdr−Vd.

An application that may benefit from said new control device is to be found in the case of a converter designed to drive a motor under continuous voltage. In such a case the motor speed is controlled simply by varying the voltage applied at the motor input pin (there is no control over torque because the current is not controlled directly). To adjust the motor speed, therefore, the output voltage of the regulator is varied. In these applications the duty cycle depends on the motor speed one wishes to obtain and it is often necessary to bring it to 100% in order to obtain the maximum speed. In such cases the bootstrap capacitance would not be recharged and controller performance would be impaired.

Many PWM controllers limit the maximum duty-cycle to 80-90% to avoid discharging the bootstrap capacitance but this results in less than optimal performance during the charging transients. According to the control device of the present invention, by contrast, the regulator can function at 100% duty cycle without any problems.

While there have been described above the principles of the present invention in conjunction with specific memory architectures and methods of operation, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicant hereby reserves the right to formulate new claims to such features and/or combinations of such features during the prosecution of the present application or of any further application derived therefrom.

We claim:

1. A control device for a switching converter having an input terminal, an output terminal, a semi-bridge of a first transistor and a second transistor coupled between the input terminal and a reference voltage, the control device comprising:
    a first circuit for driving said first transistor;
    a second circuit for driving said second transistor; and
    a converter including a bootstrap circuit for powering said first drive circuit, said bootstrap circuit including a capacitor coupled between a supply voltage and a common terminal of said first and second transistors, including a first counter and a second counter, said first counter configured to increase its count by one unit per switching cycle in which said second transistor is not switched on and said second counter containing a pre-established value, and a comparator for comparing the value of the first and second counter and able to switch on said second transistor in response to said comparison for a predetermined period of time.

2. The device according to claim 1, further comprising means capable of sending a reset signal to said first counter when said second transistor is switched on.

3. The device according to claim 1, further comprising means capable of decreasing said given value of the second counter by a given quantity at each switching cycle.

4. The device according to claim 3, wherein said given quantity comprises a variable quantity and said means comprises a device capable of varying said quantity according to the number of switching cycles.

5. The device according to claim 4, wherein said device is capable of decreasing said quantity as the number of switching cycles increases.

6. The device according to claim 1, further comprising means capable of sensing a signal on the converter output terminal, said control device regulating said sensed signal via a comparison with another reference signal and driving said first and second transistors according to said regulation.

7. A switching converter having an input terminal and an output terminal, said converter comprising a semi-bridge of a first and second transistor coupled between the input terminal and a reference voltage, said converter comprising:
    a control device including a first circuit for driving said first transistor and a second circuit for driving said second transistor; and
    a bootstrap circuit for powering said first drive circuit, said bootstrap circuit comprising a capacitor coupled between a supply voltage and a common terminal of said first and second transistor, wherein said control device comprises a first counter and a second counter, said first counter operative for increasing its count by one unit per switching cycle in which said second transistor is not switched on and said second counter containing a pre-established value, and a comparator for comparing the value of the first and second counter and operative to switch on said second transistor in response to said comparison for a predetermined period of time.

8. The converter according to claim 7, further comprising means for sending a reset signal to said first counter when said second transistor is switched on.

9. The converter according to claim 7, further comprising means for decreasing said given value of the second counter by a given quantity at each switching cycle.

10. The converter according to claim 9, wherein said quantity comprises a variable quantity and said means comprises a device for varying said quantity according to the number of switching cycles.

11. The converter according to claim 10, wherein said device is capable of decreasing said quantity as the number of switching cycles increases.

12. The converter according to claim 7, further comprising means capable of sensing a signal on the converter output terminal, said control device regulating said sensed signal via a comparison with another reference signal and driving said first and second transistors according to said regulation.

13. A control device for a switching converter having an input terminal, an output terminal, a semi-bridge of a first transistor and a second transistor coupled between the input terminal and a reference voltage, the control device comprising:
    a first circuit for driving said first transistor;
    a second circuit for driving said second transistor; and
    a converter including a bootstrap circuit for powering said first drive circuit, said bootstrap circuit including a capacitor coupled between a supply voltage and a common terminal of said first and second transistors, including a first counter, a second counter, and a comparator for comparing the value of the first and second counter and operative to switch on said second transistor in response to said comparison for a predetermined period of time.

14. The device according to claim 13, wherein said first counter further comprises a reset signal.

15. The device according to claim 13, further comprising decreasing a given value of the second counter by a given quantity at each switching cycle.

16. The device according to claim 15, wherein said given quantity comprises a variable quantity.

17. A switching converter having an input terminal and an output terminal, said converter comprising a semi-bridge of a first transistor and second transistor coupled between the input terminal and a reference voltage, said converter comprising:

a control device including a first circuit for driving said first transistor and a second circuit for driving said second transistor; and a bootstrap circuit for powering said first drive circuit, said bootstrap circuit comprising a capacitor coupled between a supply voltage and a common terminal of said first and second transistor, wherein said control device comprises a first counter, a second counter, and a comparator for comparing the value of the first and second counters and operative to switch on said second transistor in response to said comparison for a predetermined period of time.

18. The converter according to claim 17, wherein said first counter comprises a reset signal.

19. The converter according to claim 17, further comprising decreasing said given value of the second counter by a given quantity at each switching cycle.

20. The converter according to claim 17, wherein said quantity comprises a variable quantity.

* * * * *